United States Patent [19]

Goldfischer

[11] 4,119,968
[45] Oct. 10, 1978

[54] MICROWAVE CORRELATOR

[75] Inventor: Lester I. Goldfischer, New Rochelle, N.Y.

[73] Assignee: The Singer Company, Little Falls, N.J.

[21] Appl. No.: 738,002

[22] Filed: Nov. 2, 1976

[51] Int. Cl.² ............................................. G01J 1/10
[52] U.S. Cl. ......................... 343/100 ME; 343/5 MM
[58] Field of Search .................... 343/5 MM, 100 ME

[56] References Cited

U.S. PATENT DOCUMENTS

| | | | |
|---|---|---|---|
| 3,134,902 | 5/1964 | Chase et al. | 343/100 ME X |
| 3,194,511 | 7/1965 | Cohen | 343/5 MM X |
| 3,472,469 | 10/1969 | Evans | 343/5 MM X |
| 3,689,924 | 9/1972 | Caruso, Jr. | 343/100 ME |
| 3,747,094 | 7/1973 | Gamertsfelder | 343/100 ME X |
| 3,808,596 | 4/1974 | Kazel | 343/100 ME |

Primary Examiner—T.H. Tubbesing
Attorney, Agent, or Firm—Thomas W. Kennedy

[57] ABSTRACT

A microwave correlator utilizing holographic techniques and operating in a spectral region of small weather effects using passive radiometric sensing in which a phase hologram of an area to be flown over is stored in a computer aboard an aircraft and the ground area sensed with an antenna controlled by that hologram in order to develop signals indicative of the position of the aircraft over the land area.

7 Claims, 10 Drawing Figures

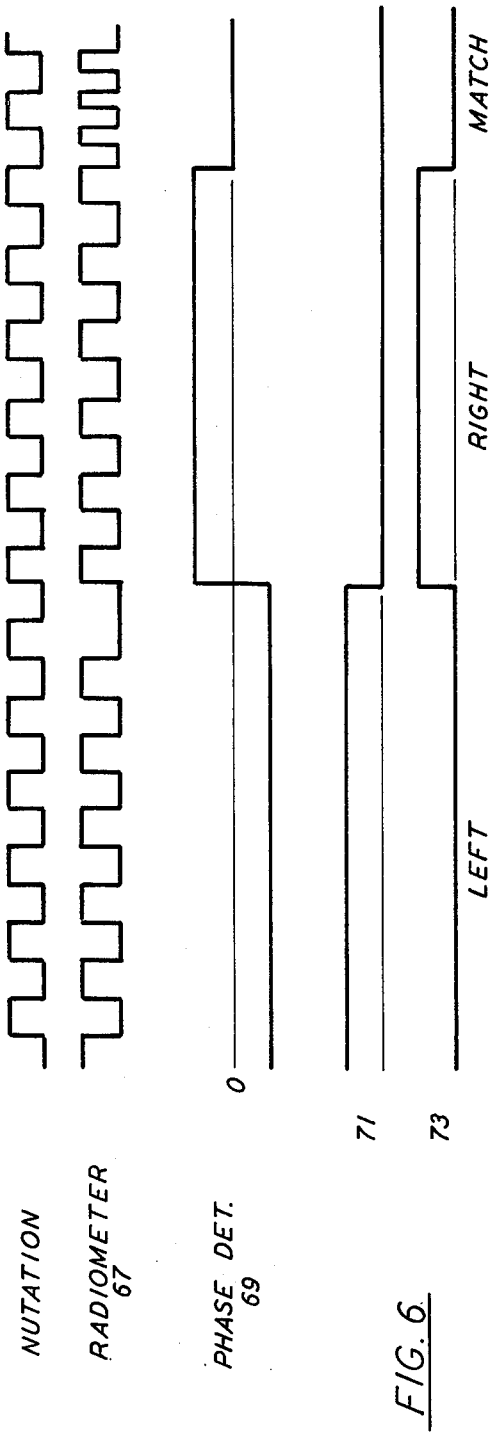
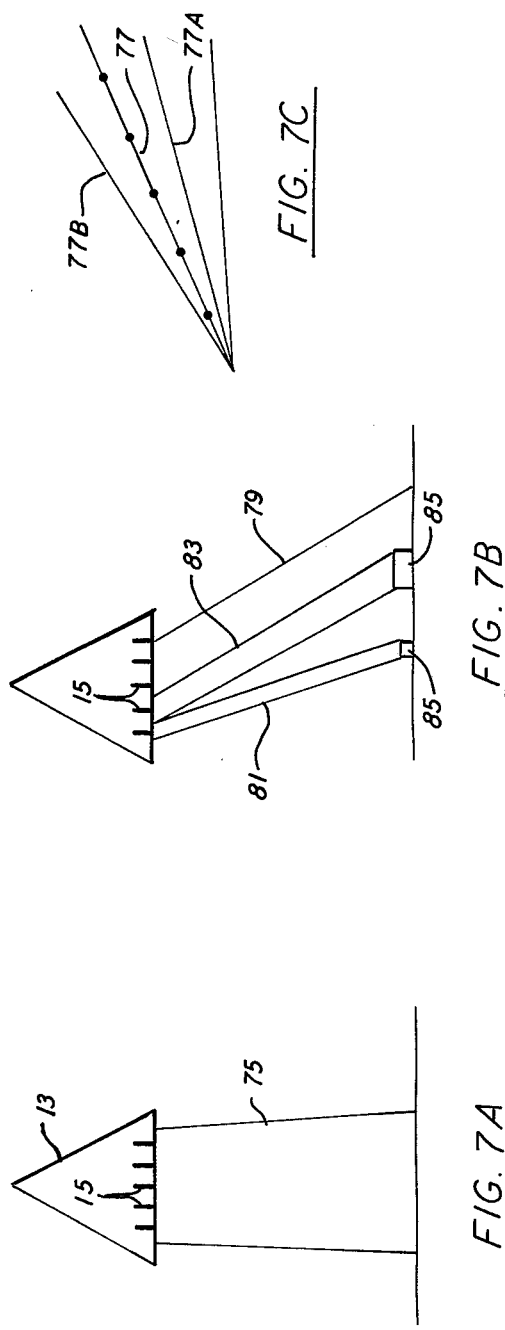

MICROWAVE CORRELATOR

The invention herein described was made in the course of or under a contract or subcontract thereunder, with the Department of the Navy.

BACKGROUND OF THE INVENTION

This invention relates to apparatus for providing position information to a vehicle operating above the surface of the earth in general and more particularly to an improved apparatus of this nature in the form of a correlator or scene matcher which determines position by comparing an internally stored, reference image to a view of the ground, observed radiometrically at microwave frequencies.

Existing position sensing devices operate at either optical or microwave frequencies. While some of the optical units form correlation or matching calculations on an area basis, i.e. without first dissecting the scene and doing an element by element calculation, these sensors cannot operate through clouds or precipitation and are limited to daylight operations. Although microwave sensors have all weather capability, all existing units must first dissect the scene before performing a correlation operation. This leads either to large processing delay when the computation is done serially or to the need for a large computing capacity if parallel data processing is carried out. Furthermore, these devices generally use active microwave devices which illuminate the ground. These types of devices are subject to detection and are hence more likely to be effected by counter-measure tactics.

In view of these deficiencies with prior art correlations, the need for an all weather device which is not subject to detection becomes evident.

SUMMARY OF THE INVENTION

The present invention provides an improved correlator which meets the above stated needs. It retains the advantages of existing position sensors which utilize microwaves while avoiding their disadvantages. To accomplish this it uses a holographic technique and operates in a spectral region of only small weather effects using passive radiometric sensing, so that it can work in all types of weather and at night as well as by day. Furthermore, through the use of the holograph, the correlation or match computation is carried out in parallel at the antenna virtually eliminating any processing delay.

In general terms, a microwave phase halogram of the particular area to be correlated is first made. Essentially, this is done by radiometric scanning to obtain a photographic image representing the ground as seen at the chosen microwave frequency. The details of the ground scene consist of a number of high emissive areas or bright spots on a darker background. Typically, areas representing heated buildings, factories and so on will be highly emissive whereas areas such as roads, runways, water and so on will be less emissive, basically reflecting the space above, which appear as dark areas. The photograph so obtained is then converted into an amplitude hologram using conventional techniques, i.e. a holograph plate is exposed by illuminating the photograph with coherent light. The amplitude hologram is converted to a phase hologram using a bleaching technique. The phase hologram is then scanned so as to obtain the phase data for a predetermined number of points. A typical resolution might be approximately one inch. In such a case, sampling of the phase data at every quarter inch, for example, would be carried out. The phase hologram information so obtained is stored in an on-board computer in the aircraft. The aircraft is equipped with an antenna. Various types of antennae may be used. In one embodiment of the invention, an antenna comprising an array of controllable phase shifting, transmission elements with a small collecting aperture above it is employed. The stored data is used to control the phase shifting in each of the individual elements of the antenna to set up therein the phase hologram of the ground scene. The computer can either store a plurality of ground scenes or such information may be transferred by a radio link as the aircraft moves from place to place. The antenna output is detected by a radiometer. By setting up the phase hologram at the antenna, the composite signal out of the antenna will indicate whether or not a match has been obtained and also make possible a determination of the amount of mis-match. As disclosed, the entire multi-beam pattern of the antenna is tilted by tilting the phase surface imposed on the array in the desired direction by the desired amount. A nutation is imposed on the normal phase surface of the array causing the multi-beam pattern to be circulated around the position of the best match. Any deviation of the mean position leads to the generation of an alternating component in the output of the radiometer coupled to the antenna. The direction of the error from the best match can be determined by the phase of this signal. The frequency of the error component is the same as the phase nutation thereby making detection thereof and of its phase possible. At the match point only components at twice the nutation frequency are present thus making possible a detection of this condition by using two synchronous detectors keyed in phase quadrature.

As noted above, the phase hologram is sampled and stored at much shorter intervals than used in the antenna array. The one inch referred to above corresponds, for example, to the spacing of the antenna elements. By storing data for every quarter inch, a simple interpolation is employed in the computer to expand or contract the scale of the stored version to the array and/or to rotate it around the center of the array. Expansion or contraction of the phase hologram causes the inverse effect to appear in the beam pattern. Thus, to accommodate a decrease in altitude the phase hologram is contracted while to accomodate an increase a hologram is expanded in scale. Azimuth deviations from the nominal at which the hologram is made are handled by rotation of the hologram. A certain amount of translation can also be provided although it is thought that in most cases a tilting will be sufficient.

In addition to using the type of antenna mentioned above, a reflective array with the collecting aperture below, i.e. in front and a transmission array with a corporate structure can also be used as the collecting structures. The latter arrangement can be built as a flat, planar array or as conformal, curved array. No matter which arrangement is used, the basic correlation computation takes place right in the antenna so that the dissection of a scene and element by element multiplication and accumulation is eliminated. This results in virtual elimination of any process delay in getting the position information.

BRIEF DESCRIPTION OF THE DRAWINGS

FIG. 3 illustrates what a typical transparancy made of the ground area of FIG. 2 might look like.

FIG. 6 is a waveform diagram helpful in understanding the operation of FIG. 5.

FIGS. 7a, b, and c are additional figures helpful in understanding the operation of the system shown and the manner in which tilting and nutation is carried out to develop error signals.

DETAILED DESCRIPTION OF THE PREFERRED EMBODIMENT

Figure 1:
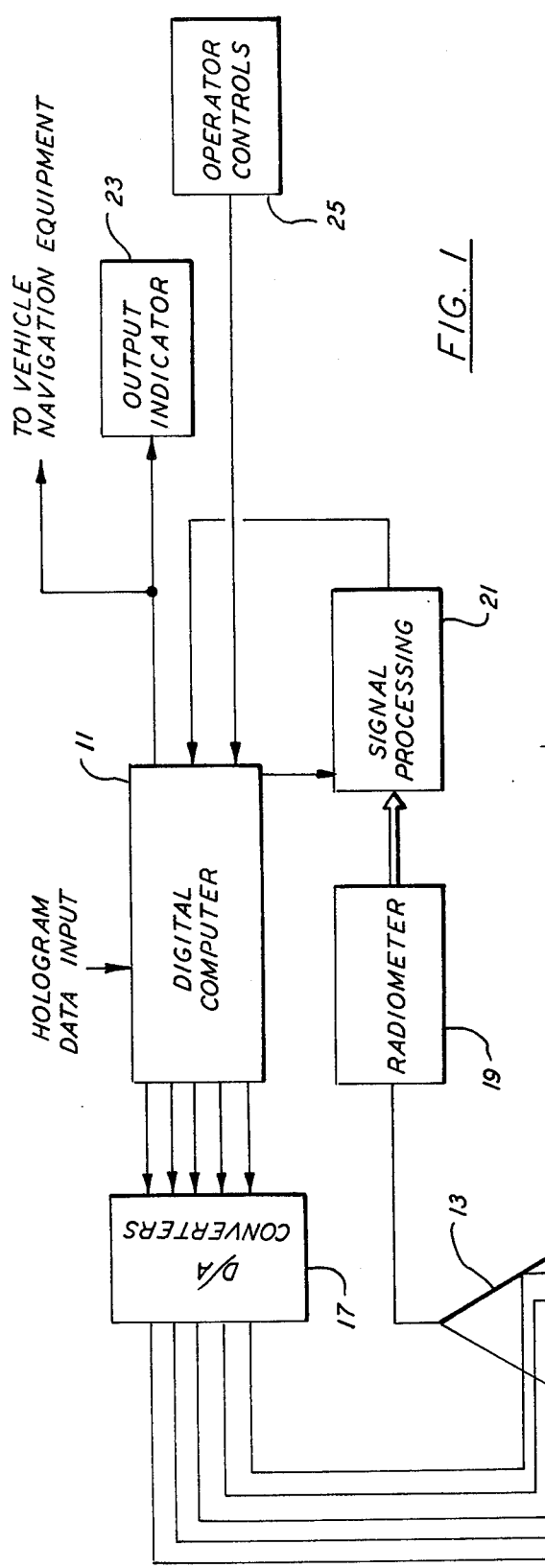
FIG. 1 is a block diagram of the system of the present invention.

FIG. 1 illustrates a basic block diagram of the system of the present invention. The heart of the system is a digital computer 11 which will be a general purpose digital computer, for example, a model SKC 2000 manufactured by the Kearfott Division of The Singer Company, Little Falls, N.J. Stored within the digital computer is phase hologram data obtained in a manner to be described in more detail below. The digital computer along with all the other apparatus shown are located within an aircraft which will be flying over the ground and desires to determine its position by correlation of the phase hologram with the actual ground scene below. The aircraft is equipped with an antenna 13 which includes a number of controllable phase shift elements 15. The phase shift of these elements is controlled by an analog signal obtained from a digital to analog converter block 17 obtaining inputs from the digital computer 11. Alternatively, digital phase shifters such as those made by Electromagnetic Sciences, Inc. of Atlanta, GA and described as "Ferrite Latching Non-reciprocal Phase Shifters" in their data sheet 7306 may be used. The digital computer 11 is programed to provide, for a given hologram, a digital word output corresponding to each of the phase shifters. Thus, there will be a digital to analog converter provided for each phase shifter, although possibly a time sharing arrangement along with sample and hold circuits may also be used. The analog outputs are then provided to the array of elements 15 in the antenna 13. Only five elements are shown. It will be recognized by those skilled in the art that a much larger number of elements will be required to obtain good correlation. Typically an antenna might include between 500 and 1000 elements. For the general types of antennas which are usable for this purpose, see the paper "An Experimental X-Band Array for Airborne Applications" by M. G. Isaac published in the NAECON '70 record, page 219-225 and also the article entitled "Airborne Arrays" published in Microwaves, June 1970, pages 44–46. The composite signal obtained by the antenna 13 after the input is conducted through each of its elements 15 is provided as an input to a radiometer 19 which detects this signal and amplifies it. The output of the radiometer is then coupled through a signal processing module 21 to be described in more detail below, with the output therefrom provided to the digital computer. The digital computer processes this information and provides an output to the operator on an output indicator 23, for example, a digitial display. This information is also provided to the on board navigation system for use therein. A further input to the computer 11 is from an operator controls block 25. This can be any conventional input device by which the operator can select the desired hologram, presuming that a number are stored, which is to be supplied to the antenna. Also shown is a data input for the hologram data. As noted above, this may be all prestored in the digital computer prior to take-off or additional updating data may be obtained through a radio link as the aircraft moves from place to place.

Figure 2:
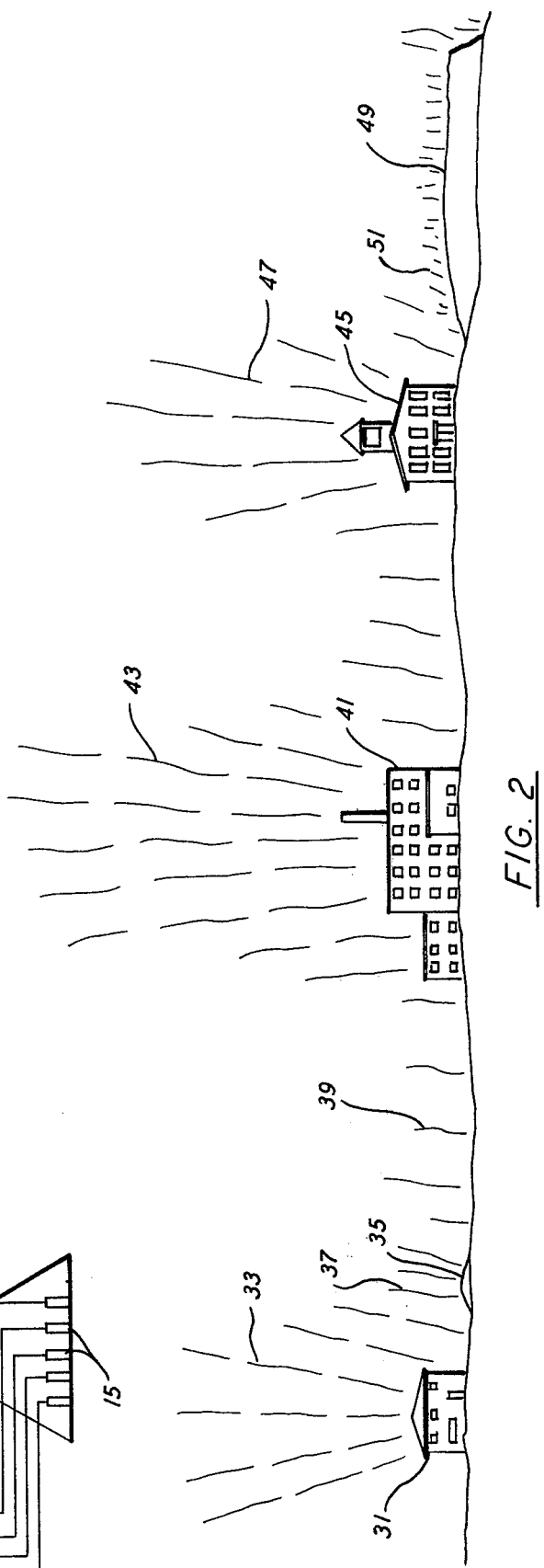
FIG. 2 is a diagram illustrating a land area showing the differences in microwave radiation from different portions thereof.

FIG. 2 is a schematic diagram illustrating the radiation at microwave frequencies at various portions of the ground. Shown is a house 31 which, because of its heating and its typically dark roof will be a good radiator. Reflective areas reflect the space above, which appears dark in the microwave spectrum. Thus, on the figure the radiation 33 from the house 31 is indicated as being of a relatively high magnitude and will appear light in the microwave spectrum. Next to the house 31 is road 35 which is mostly reflective, presuming a concrete road, and thus its radiation 37 is much lower. The ground areas adjacent to the road and house have a degree of radiation 39 less than the house, but more than the road. Also shown is a power plant 41 which, because of its high degree of heat inside, will have much greater radiation 43 and will appear even brighter than the house. A hangar 45 will have radiation 47 similar to that of the house whereas the runway 49 next to it will have a low level of radiation 51.

Figure 3:
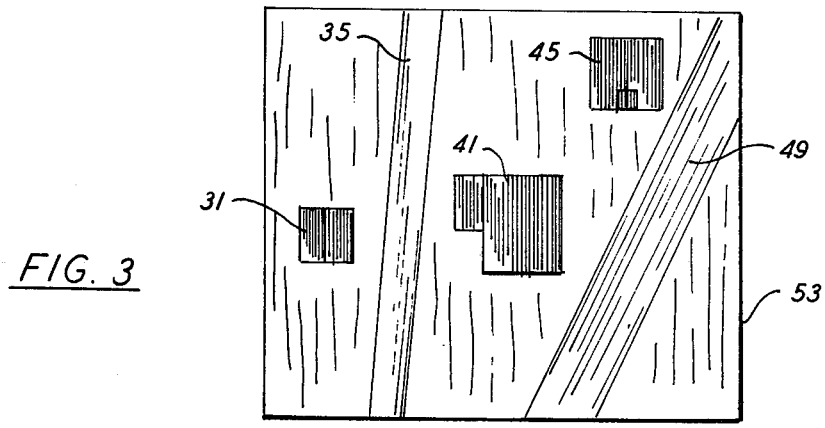
Figure 4:
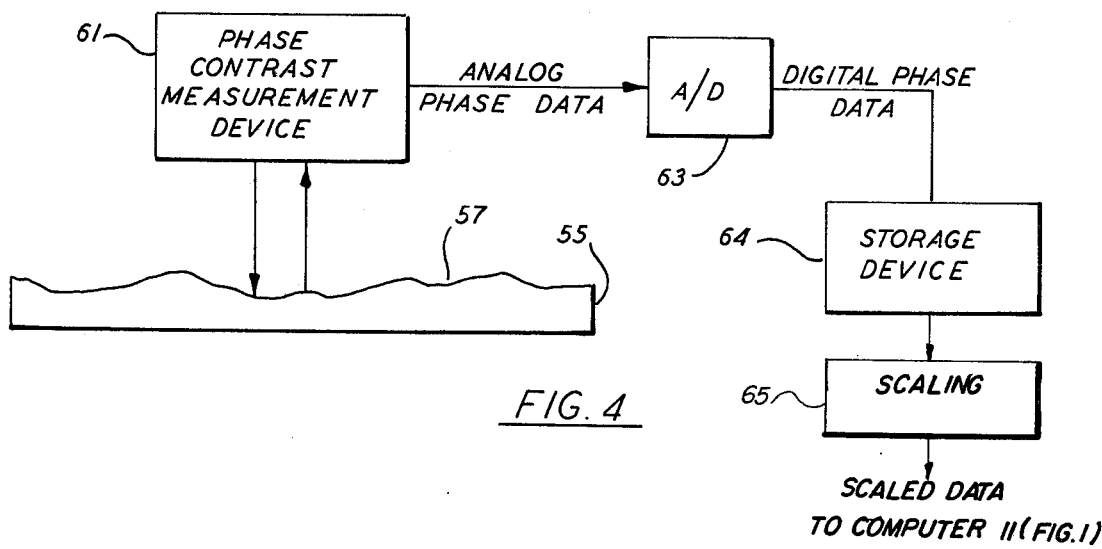
FIG. 4 is a diagram illustrating in the manner in which a phase hologram according to the present invention is scanned in order to obtain digital data for storage.

The first step in generating the hologram to be used in the digital computer 11 of FIG. 1 is in radiometrically scanning the portion of the ground where the comparison is to be made and converting the scanned information into a photographic negative. If the area shown by FIG. 2 were so scanned, a result looking something like that of FIG. 3 might be obtained. The house 31 and hangar 45 appear relatively dark with the power house 41 appearing even darker. The road 35 and runway 49 appear relatively bright. (Note that since this is a negative, the bright and dark areas are reversed.) In fact, the picture looks very much like a photograph taken on the same area and, most likely, optical photographs with suitable processing may be substituted for radiometrically obtained data. The negative so obtained is then used to generate a hologram. This is done in conventional fashion with the transparency 53 of FIG. 3 illuminated with a beam of collimated light from a collimated light source such as a laser and an additional plate exposed to obtain an amplitude hologram. This plate is then developed conventionally and is then bleached to remove the silver. The result is a plate 55 as shown on FIG. 4 having an emulsion 57 whose thickness variations are representative of phase. The patterns thereon, of course, will be the interference patterns obtained in constructing the hologram. For more information regarding phase holograms reference can be had to the text "Optical Holography" by R. J. Collier et al. (Academic Press 1971), particularly pages 289–305. This plate is now a phase hologram. In order to get the desired information from the phase hologram, a phase contrast technique similar to that used in examining thin transparent tissues is used. This method extracts a carrier beam, advanced or retarded by 90° and adds it to diffracted light to produce amplitude variations. Such a technique is described in the text "Modern Applications of Physical Optics" by M. Francon (Wiley Interscience 1963). The beam intensity so obtained is imaged on a detector in device 61 and will represent the relative phase of the light beam which in turn will be determined by the thickness at a given point on the plate. The detected optical information is coupled through an analog to digital converter 63 which digitizes it and is then stored in a storage device 64 e.g. on magnetic tape. The detector is scanned over the whole of the plate 57 in two directions and a plurality of points obtained at the desired spacing.

This stored information is then scaled in a scaler 65 e.g. 2a digital multiplier, to convert the phase information in the optical frequency range to the proper phase information in the chosen microwave frequency range. After such scaling, the information is then loaded into the digital computer 11 of FIG. 1. It is used as described above to set in the desired phase of the phase shifters 15. The result is then when there is a match between the microwave information being radiated from the ground below and the phase hologram set into the antenna 13, a maximum signal will be obtained.

Figure 5:
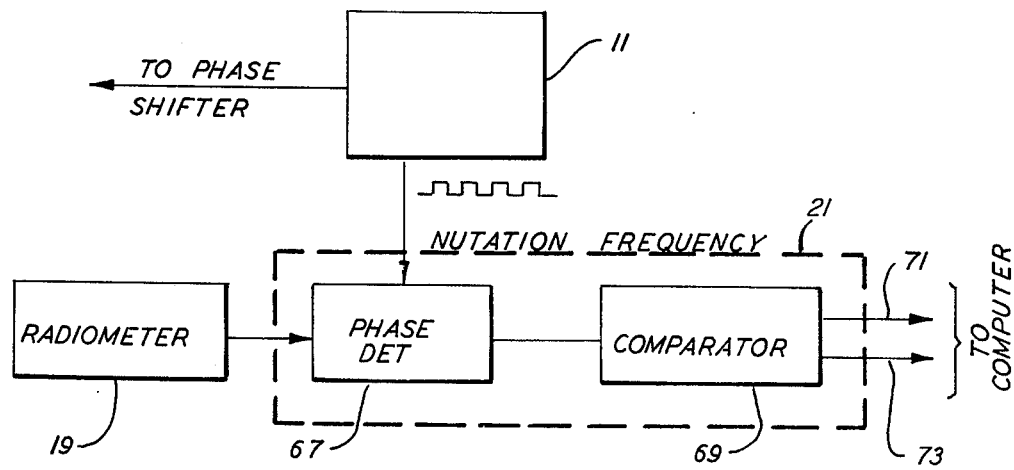
FIG. 5 illustrates in more detail a portion of the system of FIG. 1.

In order to better detect the signal, the digital computer is programmed in a manner to be described in more detail below, such that it nutates the phase hologram about a center position. Shown on FIGS. 5 and 6 is the manner in which this makes detection easier. A nutation frequency is provided as an output from the computer 11 to a phase detector 67 in the signal processing block 21. The signal input from the radiometer 19 is provided into this block. As shown on FIG. 6 if the pattern is off to the right or the left a signal at the same frequency as the nutation signal and either in phase or 180° out of phase therewith will be produced out of the radiometer. The phase detector detects this and provides either a positive or negative d.c. output which is then provided to a comparator block 69 which will contain a pair of comparators, one to detect the negative voltage and one to detect the positive voltage. Their outputs are shown respectively on lines 71 and 73. Thus, line 71, as shown by FIG. 6, will be at a positive or logic one level if the error is to the left and line 73 at a positive or logic one if off to the right. If there is a perfect match, only second harmonics will be present and the phase detector output will go to zero as will the outputs on lines 71 and 73. Thus, the computer will receive an indication of the presence of a mis-match and its direction. If desired, the output of the phase detector, whose amplitude will give an indication of degree of error, may also be digitized to provide this information into the computer to permit giving the operator an output indicating degree of error. As will be seen from the flow diagrams below, this information is used to tilt the whole phase front right or left so as to bring the hologram into correspondence with the ground scene. This is illustrated by FIGS. 7A, 7B, and 7C. Neglecting for the moment the phase shift introduced to generate the hologram, if the same phase shift is supplied to each of the elements 15 of the antenna 13, it will generate a beam 75 having its maximum in a directly downward direction (FIG. 7A). However, if the phase is supplied to the elements 15 in the form of a ramp 77 such as that shown in FIG. 7C with the phase picked off the ramps at the points indicated, the beam will be directed at an angle as shown by the beam 79 in FIG. 7B. Of course, superimposed on top of this general beam is the phase information of the hologram which, in a sense, means that a beam such as the beam 79 can be thought of as being made up of a plurality of beams 81 and 83, for example. Assuming these beams 81 and 83 are beams representing areas of high radiation on the ground, then at a match point, one would expect to find radiating structures such as houses 85 at whose points on the ground. In addition to these two factors, of course, the total beam is nutated. In effect, this corresponds to a rotation about the center of beam 77 as indicated in FIG. 7C. In other words, the beam will move between the positions 77a and 77b to carry out the nutation. This, of course, is all done by computation within the computer. In addition, if the flight path of the aircraft is different than that corresponding to the one on which the hologram was constructed, the computer must also rotate the stored image to properly line it up.

Figure 8:
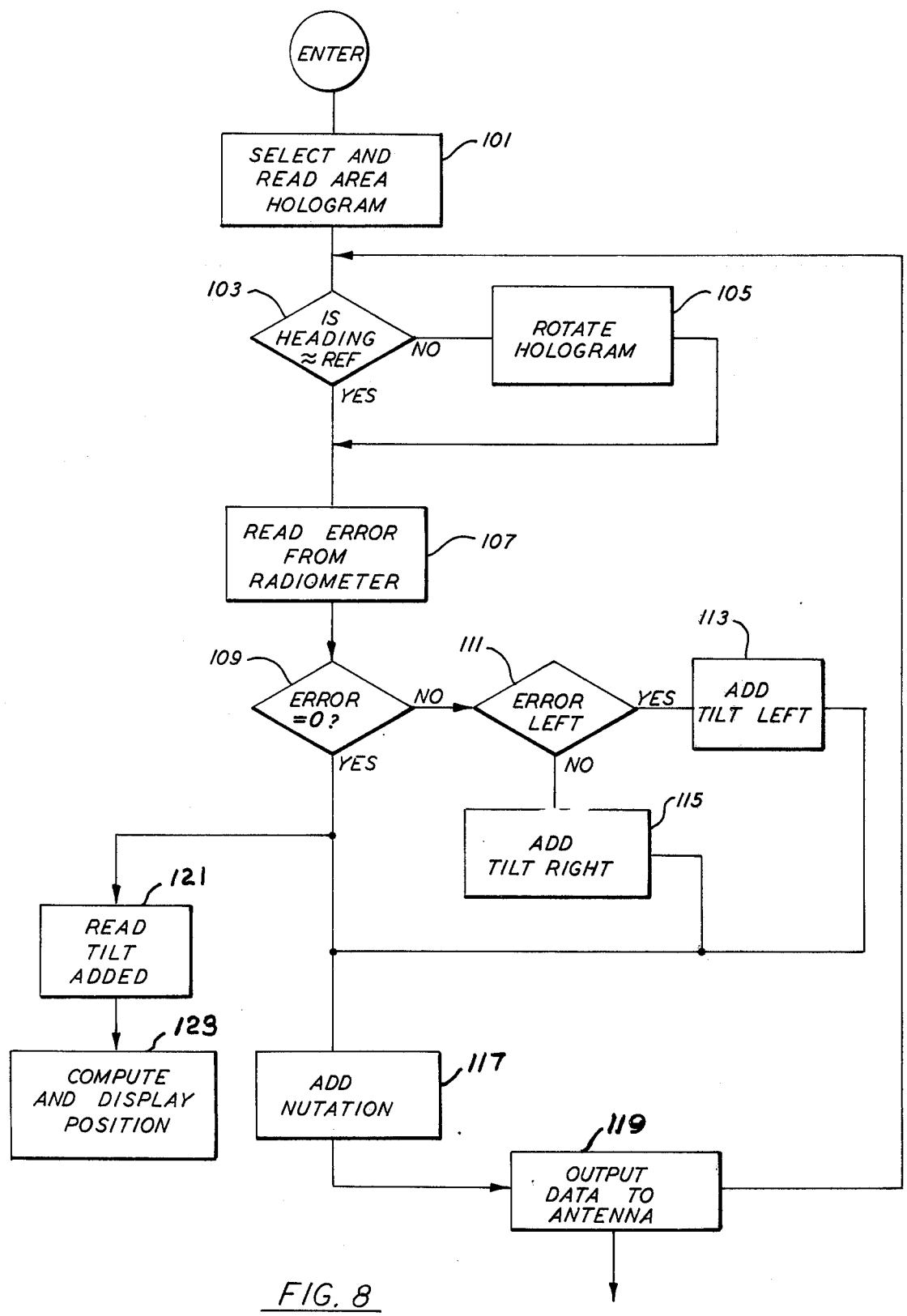
FIG. 8 is a flow diagram illustrating the manner in which the computer of FIG. 1 is programmed to carry out the method of the present invention.

FIG. 8 is a basic flow diagram showing the manner in which the digital computer 11 is programed. Upon entering the program, the hologram for the selected area is obtained from memory as indicated by the block 101. In decision block 103 a check is made to see if the hologram reference heading is equal to the heading of the aircraft. If not, the hologram must be rotated as indicated by block 105. After exiting block 103 or block 105, the data points of the hologram will now properly correspond to the aircraft heading and be properly aligned. The next step is to read the error from the radiometer as indicated by block 107. This reading is then checked in decision block 109 to see if there is an error. If there is no error, block 117 is immediately entered, where the nutation is added to the phase information after rotation, if necessary. This addition, of course, will vary in direction in order to nutate the phase about a particular point, which ideally will reach the match point. If there is an error, a check is made in block 111 to see if the error is left or right. If the error is left, left tilt is added as indicated by block 113 and if right, right tilt is added by block 115 to the phase information. After this, the nutation is carried out as indicated in block 117 whereupon the information is outputed to the antenna as indicated by block 119 and the program loops back to the heading decision block 103. In this manner, if there is an error, an increment of tilt is added as shown by FIG. 6. On the next pass through if there is still error in the same direction, additional tilt is added. This continues until a match is obtained.

Throughout, the explanation has been given simply in one dimension. It will be recognized that, in addition to a left and right tilt, fore and aft tilt can also be carried out and similarly, nutation in addition to being done in the right and left direction can also be done in the fore and aft direction. The two nutations will be done in a phase quadrature so that the phase detection apparatus shown on FIG. 6 can be duplicated with each phase detector sensitive only to one of the two quadrature error terms. Such a nutation produces a circulation around match peak. With no error, amplitude around the peak is constant. With error, amplitude rises and falls. The phase of the error signal gives the direction of error, the magnitude of the error signal gives the amount of error.

Also shown on FIG. 8 are the steps of computing and displaying position. Once a zero error is obtained, a block 121 is entered which reads the tilt added in blocks 115 and 113. From this tilt, the position of the aircraft is then computed and displayed as indicated by block 123.

The computer 11, in addition to being used for the purposes of the present invention, will also, in most cases, be used as the on-board navagation computer for the vehicle. Because of this, the computer will already have stored therein information such as the heading of the vehicle, its altitude, velocity and so on. This information in addition to the detected information and information computed in the program of FIG. 8 such as the tilt required to obtain a match permits the aircraft to determine the position by means of simple trigonometric equations. This information also permits the rotation of the hologram indicated in block 105 to be carried out without undue difficulty.

Thus, an improved apparatus for quickly determining position of an aircraft or the like through correlation with the ground which has the capability of carrying out parallel processing directly in the antenna and which is operable in all weather conditions, day and night has been shown. Although a specific embodiment has been illustrated and described, it will be obvious to those skilled in the art that various modifications may be made without departing from the spirit of the invention which is intended to be limited solely by the appended claims.

I claim:

1. A method of determining the position of a body suspended over a land area comprising the steps of:
   (a) generating a phase hologram of at least one area of the land over which the body is suspended;
   (b) sampling and digitizing the phase information in the phase hologram to obtain phase information in the optical frequency range;
   (c) scaling the phase information so obtained to the corresponding phase information in microwave frequency range;
   (d) storing the digitized phase information in a digital computer;
   (e) providing said digitized phase information to a phased array microwave antenna to individually control the elements of the antenna; and
   (f) detecting the antenna output.

2. The method according to claim 1 and further including the step of nutating the phase of all elements in the antenna to thereby develop an a.c. output of said antenna which will given an indication of a match or mis-match and the direction and degree of mis-match between the stored hologram information and the actual land mass.

3. The method according to claim 2 and further including the step of utilizing the phase front of said antenna as a whole in the direction of a detector error so as to cancel out said error.

4. The method according to claim 3 and further including the step of computing the position of said object by using the degree of tilt necessary to obtain a match.

5. Apparatus for carrying out an all weather position correlation to determine the position of an object suspended above a land mass comprising:
   (a) a multi element phased array antenna each element in said antenna having means for controlling the phase thereof;
   (b) a digital computer having stored therein a phase hologram of a land area with which correlation is desired;
   (c) means to couple the stored hologram information in said computer to the individual phase control means for the elements of said antenna;
   (d) a radiometer coupled to the output of said antenna;
   (e) a display; and
   (f) means coupling the output of said radiometer to said display.

6. Apparatus according to claim 5 wherein the computer is programmed to nutate the phase of each of the elements of said antenna and further including phase detection means coupled to the output of said radiometer, the output of said phase detection means being coupled to said display.

7. Apparatus according to claim 6 and further including means coupled to the output of said phase detection means for digitizing the output thereof, the output of said means being coupled as an input to said computer, said computer being programmed to add a phase correction to the elements of said antenna to cause a tilt of the output thereof upon receipt of an input indicating a mis-match and means to detect an input from said digitizing means indicating a match, said computer and digitizing means being the means coupling the output of said phase detector to said display.

* * * * *